2,991,306
PRODUCTION OF ALLYL ACRYLATE FROM ACROLEIN
Edward Youngman, Lafayette, and Frederick F. Rust, Orinda, Calif., assignors to Shell Oil Company, a corporation of Delaware
No Drawing. Filed Dec. 29, 1958, Ser. No. 783,094
3 Claims. (Cl. 260—486)

This invention relates to the preparation of allyl acrylate by the condensation of acrolein by aluminum alcoholates.

Allyl acrylate is a compound which has a wide variety of potentially important applications, particularly in the field of polymeric plastic and resinous materials. Thus, allyl acrylate is a valuable polymer-forming compound; further, it is a source of acrylic acid, and of other esters of acrylic acid. These other esters can be made either via esterification of the acrylic acid formed from allyl acrylate or via ester interchange by direct reaction with the alcohol corresponding to the desired other ester.

However, utilization of the potentially valuable properties of allyl acrylate, and its development as a valuable raw material, has not heretofore been practically feasible, since there has not been available an efficient process for preparing it on the necessary large scale at sufficiently low cost.

A potentially useful process for preparing allyl acrylate is that involving the so-called Tischenko reaction, wherein an aldehyde is condensed to form the corresponding ester of the corresponding acid, the condensation being effected by means of an aluminum alcoholate. Until 1950, it was not known that the Tischenko reaction could be applied successfully to the preparation of allyl acrylate from acrolein. Many earlier attempts had been made to effect that reaction, but all had failed because the highly reactive materials involved had polymerized and/or resinified, and monomeric allyl acrylate was not formed. In 1950, U.S. Patent No. 2,516,627 was granted for what has been to our knowledge, until now the only known process for successfully condensing acrolein to allyl acrylate by means of aluminum alcoholates as condensing agents. According to the patent, acrolein in a form which meets a specified test as to purity is mixed with an aluminum alcoholate and with an organic solvent, and the reaction mixture is allowed to stand at specified temperatures until the reaction is substantially complete. Allyl acrylate is then recovered by an indicated procedure. By this process, a substantial part of the acrolein charged is condensed to allyl acrylate. A further substantial amount of the acrolein is reduced to the also valuable allyl alcohol. The alcohol results from: (1) reaction of the aluminum alcoholate with the acrolein to form tri(allyloxy) aluminum and the ketone or aldehyde corresponding to the alkoxy groups of the aluminum alcoholate and (2) hydrolysis of the tri(allyloxy)aluminum with water or an aqueous solution of a strong acid or base to form the allyl alcohol.

In the course of a search for a commercially feasible route to the large scale preparation of allyl acrylate, we and our coworkers have thoroughly investigated the process of U.S. Patent No. 2,516,627. We have found that process overcomes to a large extent the formation of resinous and/or polymeric materials, and produces substantial yields of allyl acrylate, and of allyl alcohol. We have also found, however, that the process produces a substantial amount of polymeric and/or resinous materials. Thus, we have confirmed the fact shown in the patent itself that but a part—in many cases, less than half—of the acrolein charged is transformed to monomeric products, primarily allyl acrylate and allyl alcohol. We have found that substantially all, if not all, of the remaining acrolein is transformed to useless polymeric and/or resinous materials.

We now have discovered that the process of U.S. Patent No. 2,516,627 can be substantially improved and that the Tischenko reaction may be employed to transform acrolein substantially quantitatively to monomeric products, primarily only allyl acrylate and allyl alcohol, provided that the conversion of the acrolein is limited, the reaction of the acrolein being halted at a point substantially short of the point at which reaction of the acrolein otherwise would be considered complete. While the reaction mechanisms involved have not been entirely determined, and while the exact reasons for the different result are not known, it appears that in part at least, the different result may flow from differences in the rates of the various reactions involved, and from the different materials that are present in the reaction mixture as the various reactions go forward. It appears that the most rapid reaction involved is the reaction of the catalyst with the acrolein to form tri(allyloxy)aluminum. The condensation of acrolein to allyl acrylate goes forward at a somewhat slower rate. Polymerization of acrolein also apparently occurs, but at an even slower rate. This polymer apparently forms a complex, perhaps a chelate, with the tri(allyloxy)-aluminum, and this complex, or chelate, apparently tends to promote and/or catalyze various polymerization and resinification reactions involving various components of the reaction mixture, but apparently does not catalyze the condensation of the acrolein to allyl acrylate. Since the formation of the complex or chelate withdraws from the reaction zone the tri(allyloxy)aluminum, the active catalyst for the condensation of the acrolein, the rate of acrolein condensation falls steadily and rapidly. In any case, it has been found that beginning at the time the acrolein is mixed with the aluminum alcoholate, allyl acrylate is formed without formation of significant amounts of polymeric materials. Then as the various reactions progress after there has been produced a substantial amount of allyl acrylate, there occurs a sudden rapid rise in the rate at which polymeric materials are formed, and at the same time there occurs a corresponding rapid fall in the rate at which allyl acrylate is formed. By terminating the reaction at the point at which a substantial amount of allyl acrylate is formed, yet at which the amount of polymer formed is very low, substantially quantitative conversion of the acrolein to monomeric products results.

Broadly, therefore, the new process which embodies our discovery comprises mixing anhydrous acrolein with an aluminum alcoholate catalyst and allowing the mixture to stand for a period of time sufficient to permit a substantial conversion of acrolein to form monomeric products, but without formation of substantial amounts of polymeric products, then terminating the reaction and recovering monomeric allyl acrylate. The requisite conversion of acrolein—that is, the level of acrolein conversion at which a substantial amount of allyl acrylate is formed, but at which little or no polymeric material is formed—can be ascertained by means of the data set out hereinafter, or it may be determined in any given case by a preliminary experiment. In any particular application of our new process, the point at which the requisite conversion of the acrolein is attained can be determined by any suitable testing method which enables the operator to follow the course of the reaction.

To avoid any misunderstanding regarding the meanings of the terminology used in this specification, the following terms are to be understood to have the indicated meanings:

(a) *Conversion.*—The fraction of acrolein charged which reacts and disappears from the reaction mixture, regardless of the nature and character of the product or products of the reaction. Ordinarily determined by determining the difference between the amount of acrolein charged and the amount recovered after the reaction has been terminated, with appropriate accounting for any acrolein lost mechanically in conduct of the reaction.

(b) *Yield.*—The fraction of acrolein converted which is recovered as a particular product calculated on a stoichiometric basis—that is, the fraction obtained by comparing the number of moles of particular product produced in a given reaction with the number of moles of that product which would have been produced had all of the acrolein converted been transformed to that product, with due regard to the stoichiometric relations involved.

It is to be noted that this definition of the term "conversion" is quite different from the meaning of that term as it is used in U.S. Patent No. 2,516,627. In the patent, the conversion of acrolein is the fraction determined by comparing the amount of a particular product with the amount of acrolein charged, stoichiometric relations being taken into account. See the examples set out in the patent. If one performing the process of the patent uses the methods given therein for determining when the reaction is complete (column 4, lines 37–44 of the patent), it will be found that substantially all of the acrolein will have been reacted. Thus, the "conversion" of acrolein set out in the patent is equivalent to the term "yield" as it is used in this specification.

In passing, it may be noted that while superficially our new process may appear to be quite similar to the process described in U.S. Patent No. 2,516,627, on close inspection, it will be found that our new process differs significantly from that of the patent, and that our new process produces yields of valuable monomeric products—particularly allyl acrylate—far greater than those which are obtained by the process of the patent, with corresponding greatly reduced production of useless polymeric materials as compared to the process of the patent. The most significant difference between the two processes, of course, is the fact that in the process of the patent, substantially quantitative conversion (as that term is used in this specification) occurs, while in our new process, the conversion of the acrolein is deliberately limited, often to but 50 or less. Thus, at column 4, lines 37–44, the patent teaches that the reaction of acrolein is considered complete when testing of the reaction mixture shows that no increase in the ester content thereof is occurring. In the usual case, when completion of the reaction is determined in this way, the reaction will be found to be complete only when substantially all of the acrolein has been consumed, since it will be found that the ester content of the reaction mixture continues to increase until substantially all of the acrolein has been reacted—the rate of ester formation will be very rapid until a certain point is reached (the point when substantial polymer formation begins), then while the rate of ester formation will decrease rapidly thereafter, there yet will be continuous formation of ester. In contrast, according to our invention, the conversion of acrolein is halted at the point at which substantial polymer formation begins. The efficacy and advantages of this different procedure we have discovered are evident from the fact that the yield of monomeric products from practice of the process of the patent is at most about 60%, with maximum yield of allyl acrylate of about 40%, whereas a yield of monomeric products of above 90%, with a yield of allyl acrylate of 80% or more is easily attained by practice of our new process.

Acrolein from any source is suitable in the practice of our new process, provided that the acrolein used is substantially anhydrous. One suitable test for determining if the acrolein to be used is sufficiently free from water is that set out in detail in U.S. Patent No. 2,516,627. Suitable methods for removing water from acrolein, should such be necessary, also are set out in that patent.

The condensation catalyst used in our new process is an aluminum alcoholate. Primary, secondary or tertiary alcohols can be used in preparing the alcoholates which can advantageously be produced by reacting the alcohols with metallic aluminum as described in U.S. Patent No. 2,845,447. Aluminum alcoholates derived from alcohols having one to eight, preferably three to six carbon atoms per molecule are an advantageous sub-group of the useful alcoholates. While aliphatic alcohols are usually preferred for the preparation of the aluminum alcoholates used as the catalyst, especially the secondary aliphatic alcohols, one can also use those derived from aralkyl alcohols such as benzyl alcohol, phenyl isopropyl alcohol, etc. Mixed as well as simple aluminum alcoholates (alkoxides) can be used. Thus, methyl, ethyl, propyl, isopropyl, normal-, secondary-, tertiary- and isobutyl, the amyl, hexyl and higher alcohols can be used individually to produce aluminum alkoxides in which the three alkoxide groups are identical, or mixtures of two or more of these alcohols can be used with the result that more than one type of alkoxide group may be present in a given molecule of the aluminum alkoxide employed as the catalyst. The alcoholates of aluminum with secondary alcohols of from 3 to 4 carbon atoms—that is, the alcoholates of aluminum and isopropyl alcohol and of aluminum and secondary butyl alcohol—are preferred.

It is essential to the production of high yields of allyl acrylate from the acrolein that the amount of catalyst be limited. In most cases, at least about 0.001 mole of catalyst per mole of acrolein charged will be required to obtain the desired reaction rates. While larger amounts of catalyst may be used, it is desirable that the catalyst concentration not exceed about 0.10 mole per mole of the acrolein charged. The reasons for this limitation are as follows: since the acrolein reacts with the catalyst, the acrolein being recovered as allyl alcohol, as the amount of catalyst used is increased, an increasing proportion of the acrolein converted will be recovered as allyl alcohol. Since the reaction of the catalyst with the acrolein proceeds at a substantially higher rate than does the condensation of the acrolein with itself, if very high catalyst concentrations are used, allyl alcohol will be produced at the expense of the production of allyl acrylate, with resulting reduction in the yield of allyl acrylate from the acrolein converted. Further, production of allyl alcohol in this manner is expensive, and often uneconomic. Consequently, the amount of catalyst charged must be limited to that which permits maximum yields of allyl acrylate from the acrolein converted. Since in the majority of cases, little additional advantage from the standpoint of rate increase accrues from the use of more than about 0.10 mole of catalyst per mole of acrolein, this fixes the usual maximum catalyst concentration used. Usually, a catalyst concentration of 0.05 mole or less per mole of acrolein will be found quite sufficient. Further, as will be pointed out hereinafter, the maximum level of acrolein conversion which can be permitted in any given case taking into account the requirement that substantially only monomeric, and substantially no polymeric products, be produced, is related to the concentration of catalyst used. Consequently, the amount of catalyst used in any particular case will be determined not only by the criterion of satisfactory reaction rates, but also by the criterion of the desired conversion of acrolein and the criteria of the desired yield of allyl acrylate from the acrolein converted. In most cases, it will be found that a catalyst concentration of less than about 0.05 mole per mole of acrolein will be most economic, with the optimum catalyst concentration being about 0.01—that is, from about 0.005 to about 0.015—mole of catalyst per mole of acrolein.

It will be noted that in this respect, also, our new process differs significantly from that of U.S. Patent No. 2,516,627: in our new process, maximum efficiency in the production of allyl acrylate ordinarily is obtained through the use of catalyst concentrations below about 0.05 mole per mole of acrolein, whereas in the process of the patent, catalyst concentrations below about 0.04 mole per mole of acrolein are considered to be inefficient, and therefore undesriable. See column 3, lines 62–69, of the patent.

Condensation of the acrolein is effected by simply mixing the acrolein and the catalyst and allowing the mixture to stand, either with or without further mixing thereof, for a sufficient time to permit the desired conversion of acrolein, then the reaction is halted and allyl acrylate, allyl alcohol and unreacted acrolein recovered.

The condensation may be conducted without the use of any solvent. However, in some cases, it may be desirable to include a solvent in the reaction mixture. Thus, a solvent can be used to advantage should it be found that the aluminum alcoholate catalyst used is insufficiently soluble in acrolein to provide the necessary concentration of catalyst dissolved in the acrolein. Also, a solvent which boils at a temperature above the boiling temperature of allyl acrylate may be used to aid in removing the allyl acrylate, by acting to entrain the allyl acrylate from the reaction mixture.

As the solvent medium, there may be employed, for example, xylene or other aromatic hydrocarbon solvents, or mixtures of such aromatic hydrocarbons, carbon tetrachloride, chloroform, or other halogenated hydrocarbon solvents, diethyl ether or other ethers, and like anhydrous organic solvents of appropriate boiling point or boiling point range. If the allyl acrylate is to be recovered from the reaction mixture by distillation, the solvent of course desirably is one that does not boil at a temperature so near the boiling temperature of the desired product that the separation would be impeded. The solvent conveniently may be added to the reaction mixture as the solvent in a previously prepared solution of the aluminum alcoholate. Alternatively, it may be added separately to the reaction mixture or to either the acrolein or the aluminum alcoholate prior to their admixture. From about 10 to about 1000 volumes of the solvent per 100 volumes of the acrolein may be employed conveniently. Larger amounts, although operable, may reduce the efficiency of the process through excessive dilution of the reactants.

After the acrolein, the catalyst, and if used the solvent, are mixed, the reaction mixture is allowed to stand, either with, or without stirring or agitation, until the necessary conversion of acrolein has been attained. The reaction time used, of course, will be determined by the rate at which the reaction progresses to the termination point— the point at which the necessary acrolein conversion is attained. During the reaction, the reaction mixture is maintained at a suitable temperature, desirably between about 0° C. and about 65° C. Preferably, temperatures above about 50° C. and below about 5° C. are avoided, and we prefer to use temperatures of about 30 C., that is, from about 15° C. to about 45° C., during the reaction. The reaction mixture may be agitated during the reaction period, although such is not necessary in most cases. The course of the reaction is followed conveniently by checking the amount of acrolein remaining unconsumed as the reaction progresses, known methods being available for analyzing the reaction mixture for acrolein. Alternatively, by preliminary experiment, the relationship between acrolein conversion and reaction time for a given set of conditions may be determined and this data used in controlling the reaction in subsequent condensation of the acrolein under those same conditions.

When the acrolein conversion has attained the desired level, the reaction is halted, one of two general methods being employed for the purpose. According to one method, the catalyst is destroyed to halt the acrolein condensation. Destruction of the catalyst can be effected, for example, by adding water to the reaction mixture, the water reacting with the catalyst to form aluminum hydroxide, which is not a catalyst for the condensation of acrolein. The allyl acrylate, allyl alcohol, ketone or aldehyde formed by the reaction of the acrolein with the aluminum alcoholate catalyst and unreacted acrolein then can be removed from the catalyst by distillation or by filtration or centrifugation of the reaction mixture. The other, and by far the preferred method, however, comprises simply subjecting the crude reaction mixture to distillation under such conditions that the allyl acrylate, unreacted acrolein, ketone or aldehyde and if a solvent is used, a part or all of the solvent, are rapidly distilled overhead from the reaction mixture—e.g., the allyl acrylate and unreacted acrolein are "flashed" overhead from the reaction mixture. This method is based upon the discovery of one of us and our co-worker, Mr. Harry D. Finch, that such a method for effecting recovery of the allyl acrylate and unreacted acrolein unexpectedly is possible. Prior to that discovery, such a method was not considered possible, because it was believed that the highly reactive components of the reaction mixture, particularly acrolein, could not be distilled from the mixture containing the highly active catalyst without a substantial amount of undesirable side reactions. It was found, however, that if the distillation were conducted in such a way that the volatile materials were removed very rapidly from the reaction mixture, substantially no side reaction occurred. Use of this method for recovering the allyl acrylate and unreacted acrolein from the reaction mixture has several substantial advantages:

(1) It avoids contaminating the unreacted acrolein with water. This is very important where the unreacted acrolein is to be recycled, for it is essential to the successful condensation of the acrolein that it be substantially anhydrous. However, acrolein forms an azeotrope with water, so that if water is present, anhydrous acrolein for recycle is obtained only with substantial difficulty. Flashing of the allyl acrylate and unreacted acrolein without addition of water obviates all of these difficulties.

(2) It permits easy and separate recovery of the allyl acrylate and allyl alcohol: after the allyl acrylate and unreacted acrolein have been separated from the catalyst, the catalyst is hydrolyzed and the resulting allyl alcohol easily recovered as a separate product.

Hence, the allyl acrylate and unreacted acrolein preferably are recovered by "flash" distillation of the crude reaction mixture. Separation of the allyl acrylate from the mixture with unreacted acrolein is effected by known techniques—conveniently, it is effected by distillation.

The improved method for halting the acrolein condensation and recovering both the allyl acrylate product and the unreacted acrolein forms the subject of copending application Serial No. 783,093, filed December 29, 1958, which is incorporated in and made a part of this specification for the purpose of describing that method in detail.

A further advantage of the "flashing" method for effecting separation of the catalyst is that it permits the ready re-use of the catalyst should such be found to be desirable. However, it must be pointed out that as mentioned hereinbefore, the tri(allyloxy) aluminum which is formed by reaction of the aluminum alcoholate originally charged and the acrolein, and which appears to be the active catalyst in our process, may further react or complex with any polymeric material that may be formed during the acrolein condensation and the complex not only fails to catalyze the condensation of acrolein but promotes polymerization of acrolein. Usually a small amount of such polymeric material and such complexing of the catalyst is unavoidably produced. Consequently, in most cases, it will be found undesirable to re-use the catalyst recovered from the final reaction mixture. Treatment of the catalyst with water or aqueous strong acid or base such as sulfuric acid or sodium hydroxide enables recovery of the allyloxy moieties of the catalyst as allyl alcohol.

As has already been mentioned hereinbefore, we have found that the maximum permissible conversion of acrolein—the maximum conversion of acrolein at which substantially all of the acrolein consumed is transformed to monomeric products (chiefly allyl acrylate and allyl alcohol) and substantially none of the acrolein is transformed to polymeric products—is related to the concentration of catalyst which is used. The reason that this relationship exists is not clear, but we have found that the maximum permissible conversion of acrolein increases as the catalyst concentration is increased. Thus, assuming that substantially quantitative transformation—that is, 95% or more—of the acrolein to monomeric products is desired, we have found that the maximum permissible acrolein conversion varies from about 18% at a catalyst concentration of about 0.001 mole per mole of acrolein to about 30% at a catalyst concentration of about 0.01 mole per mole of acrolein to about 55% at a catalyst concentration of about 0.05 mole per mole of acrolein to about 80% at a catalyst concentration of about 0.10 mole per mole of acrolein. If one is willing to accept the production of some polymeric material in order to obtain greater conversion of acrolein per pass—for example, if one is willing to accept but about 85% transformation of the acrolein to monmeric products—then we have found that the maximum permissible acrolein conversion is somewhat higher, for the same catalyst concentration. For example, at a catalyst concentration of about 0.001 mole per mole of acrolein, at least about an 85% yield of monomeric products is obtained by limiting the conversion of acrolein to a maximum of about 25%, the maximum permissible conversions of acrolein for this yield at catalyst concentrations of 0.01, 0.05 and 0.10 moles per mole of acrolein, respectively, being respectively about 42%, about 65% and about 85%. To ascertain the maximum permissible acrolein conversions for different catalyst concentrations requires only interpolation or extrapolation of one of the smooth curves passing through the values given above. Of course, in any given case, less than the maximum permissible acrolein conversion may be accepted in order to insure that substantially quantitative, or the desired, yield of monomeric products is obtained. The effect of increasing catalyst concentration on the relative amounts of allyl acrylate and allyl alcohol must, of course, be considered in selecting the amount of catalyst to be used. See column 4 of this specification.

This completes the general description of our new process. Application of that process in particular instances is illustrated by the following examples. It is to be understood that these examples are included only for the purpose of illustration of our invention, and are not intended or to be construed as limiting that invention in any way not specifically recited in the appended claims.

In all of the examples, the following technique was used in conducting the reaction: If a solvent was not used, the catalyst was added to the stirred acrolein. If a solvent was used, the catalyst was dissolved in solvent and the acrolein was added to the stirred catalyst solution. The mixture was either stirred, or was allowed to stand, but occasionally shaken. Where necessary, samples were taken for analysis by gas chromatographic methods to determine the acrolein content, and thus to determine the course of the reaction. When the desired acrolein conversion had been attained, the reaction mixture was flashed at reaction temperature and reduced pressure (about 1 millimeter mercury pressure). If solvent was used, then it too was removed by distillation. The residue, catalyst, was then treated with aqueous sodium hydroxide and the mixture distilled to recover allyl alcohol. The overhead product from the flash distillation then was fractionated to separate allyl acrylate, unreacted acrolein and solvent, if such was used. The products then were analyzed.

*Example I*

In this experimental work, xylene was used as solvent. The catalyst was tri(sec-butoxy)aluminum. Catalyst concentration was 0.01 mole per mole of acrolein. Solvent concentration: 30% of the weight of the acrolein. Reaction temperature: 30° C. The reaction was conducted for 3 hours, at the end of which time 23.3 percent of the acrolein had been converted. There was obtained a yield of allyl acrylate of 87.2% and a yield of allyl alcohol of 12.8% for a total yield of monomeric products of 100%, based on the acrolein converted.

In a similar experiment, the reaction was conducted for 17 hours, at the end of which time 39.7 percent of the acrolein had been converted. The yield of allyl acrylate was 74.4% and the yield of allyl alcohol was 8.3%, for a total yield of monomeric products of 82.7%.

It was found that as further conversion of acrolein occurred, the yield of monomeric products fell off rapidly.

*Example II*

In this experimental work, no solvent was used. 0.007 mole of tri(sec-butoxy)aluminum per mole of acrolein was used as catalyst. Reaction temperature: 20° C. Reaction time: 1.5 hours. Acrolein conversion: 20.4%. Yield of allyl acrylate: 89%. Yield of allyl alcohol: 10%.

*Example III*

A mixture of approximately equal parts by weight of xylene and acrolein containing 0.08 mole percent, based on the acrolein, of tri(isopropyloxy)aluminum as catalyst, was maintained at 23° C. for 1.25 hours. 47.5% of the acrolein was converted at this time. From samples, it was determined that at this point, the yield of allyl acrylate was 51% and the yield of allyl alcohol was 48%, both yields being based upon the amount of acrolein converted.

Continuing the experiment, it was found that a combined yield of allyl acrylate plus allyl alcohol of 95% was obtained at an acrolein conversion of about 54%, and that as the acrolein conversion exceeded about 65%, the yield of monomeric products fell off rapidly, with concurrent rapid rise in the amount of polymeric products produced.

We claim as our invention:

1. In a process for the preparation of allyl acrylate by the condensation of acrolein under substantially anhydrous conditions and in the presence of an aluminum alcoholate as catalyst, the improvement which comprises employing from about 0.001 to about 0.10 mole of aluminum alcoholate per mole of acrolein and limiting the conversion of acrolein to a substantial level not exceeding a maximum varying from about 25% at a catalyst concentration of about 0.001 mole per mole of acrolein to about 85% at a catalyst concentration of about 0.10 mole per mole of acrolein.

2. In a process for the preparation of allyl acrylate by the condensation of acrolein under substantially anhydrous conditions and in the presence of an aluminum alcoholate, the improvement which comprises employing from about 0.001 to about 0.10 mole of tri(isopropoxy)aluminum per mole of acrolein and limiting the conversion of acrolein to a substantial level not exceeding a maximum varying from about 25% at a catalyst concentration of about 0.001 mole per mole of acrolein to about 85% at a catalyst concentration of about 0.10 mole per mole of acrolein.

3. In a process for the preparation of allyl acrylate by the condensation of acrolein under substantially anhydrous conditions and in the presence of an aluminum alcoholate, the improvement which comprises employing from about 0.001 to about 0.10 mole of tri(sec-butoxy) aluminum per mole of acrolein and limiting the conversion of acrolein to a substantial level not exceeding a maximum varying from about 25% at a catalyst concentration of about 0.001 mole per mole of acrolein to about 85% at a catalyst concentration of about 0.10 mole per mole of acrolein.

References Cited in the file of this patent

UNITED STATES PATENTS 2,516,627     Hearne et al. _____ July 25, 1950

FOREIGN PATENTS 945,984     Germany _____ July 19, 1956

OTHER REFERENCES

Hine: "Physical Organic Chemistry," 1956, pp. 261–263.